April 10, 1945.    E. T. ALLEN    2,373,088
STALL INDICATORS
Original Filed Nov. 2, 1940
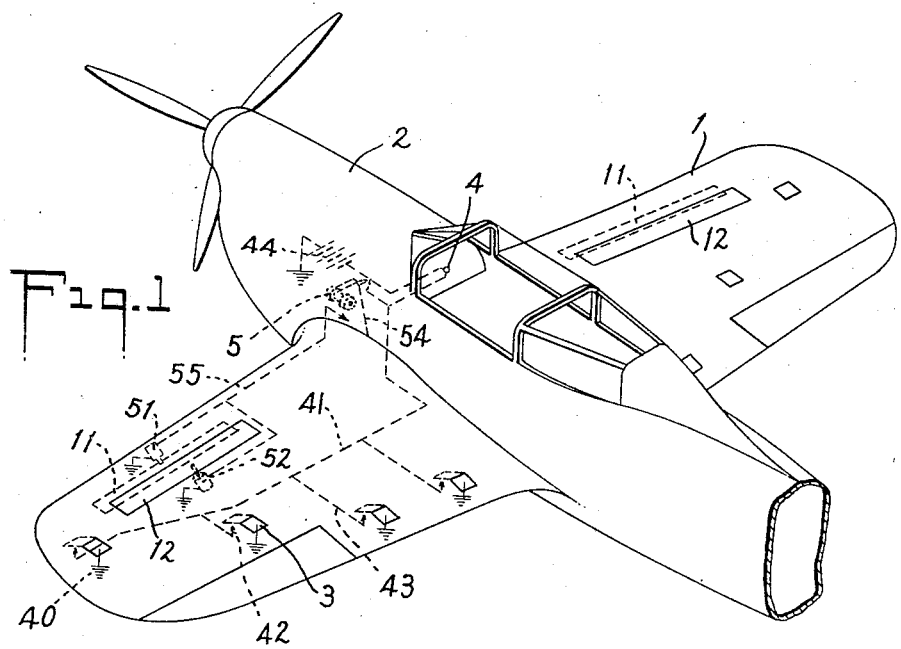
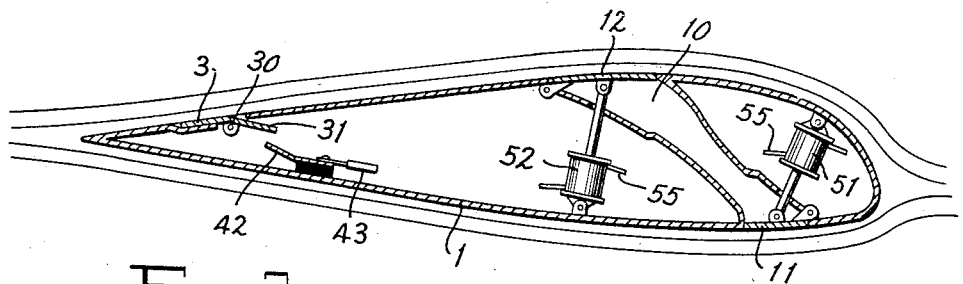
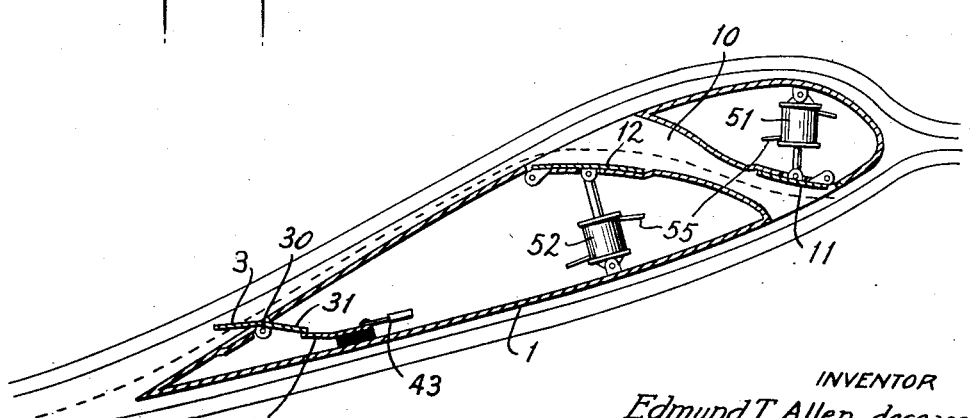
INVENTOR
Edmund T. Allen, deceased
Florence Brydon Allen, executrix
BY Reynolds + Beach
ATTORNEYS Patented Apr. 10, 1945

2,373,088

UNITED STATES PATENT OFFICE 2,373,088

STALL INDICATOR

Edmund T. Allen, deceased, late of Seattle, Wash., by Florence Brydon Allen, executrix, near Seattle, Wash., and The Pacific National Bank of Seattle, executor, Seattle, Wash., assignors to Boeing Aircraft Company, Seattle, Wash., a corporation of Washington Original application November 2, 1940, Serial No. 364,090. Divided and this application June 7, 1943, Serial No. 490,005

4 Claims. (Cl. 177—311)

This invention relates to indicating systems for warning of stalling air flow over an airfoil, and is a division of the application of Edmund T. Allen and Robert J. Minshall, Serial No. 364,090, filed November 2, 1940.

There have been numerous attempts to indicate to the pilot of an airplane when stall conditions arise. Some indicating devices depend upon the attitude or angle of attack of the airfoil; some are located in the nose portion of the airfoil, or ahead thereof, and depend upon difference of pressure; some depend upon airspeed. It is believed that no stall indicator as heretofore proposed has gone into practical use, perhaps for the reason that either they are affected by conditions other than stall, and hence may give a false indication, or they are so insensitive to the inception of a stall that the stall is substantially complete before an indication is given, which is too late.

For instance, in straight-away flight, an angle of attack which with flaps up will produce a stall, with flaps down may not produce a stall, yet a device sensitive to attitude, or to pressure distribution at the nose, would ordinarily, in either such case, indicate a stall. This indication would be correct in the first instance, but wrong in the second. Where it was right, it might still be too late. Where it was wrong it would be misleading, and would tend to produce doubt even when an actual stall occurs, until too late.

A stall may occur in gusty air, such as will give the airplane an acceleration of 1.5 G, the usually accepted design factor. If a plane is designed so that stall will not occur above 60 M. P. H., in gusty air the stall may occur at $$60\sqrt{1.5}$$

M. P. H., or approximately 68 M. P. H. A plane coming in for a landing at 65 M. P. H. for instance, would be safely above the normal stalling speed, yet in gusty air would be below the actual stalling speed. A stall indicator based upon air speed would be entirely inadequate and erroneous under such conditions.

Again, a plane having a stalling speed of 60 M. P. H. may be considered, with an air speed indicator operating as a stall indicator, accomplishing a 60° banked turn. Stall occurs in such accelerated flight at $$60\sqrt{\frac{a}{G}}$$

where $a$ is the acceleration, and the acceleration in a 60° bank is 2G. Stall in such a case occurs at approximately 85 M. P. H., and if the stall indicator of the air speed type is set to indicate a stall at 60 M. P. H., quite clearly it is totally useless when stall actually occurs under such conditions at 85 M. P. H.

It is the primary aim of the present invention to provide a means adaptable to any airfoil which will give an indication to the pilot as soon as a stalling condition occurs, under any or all flight conditions, and before it has been more than initiated at any critical location upon the airfoil, and which is affected only and directly by stall conditions, so that it will not give a false indication.

More specifically, and since a stall is created by or is accompanied by a reversal of flow over a surface or disturbance of smooth flow over it, known as "burbling," and consequent destruction of lift, it is an object to provide a stall indicator sensitive to stalling flow conditions. Such indicator or indicators are located at a point or points in the surface where stalling or "burbling" flow commences, usually along the trailing edge of the airfoil, but sometimes at the airfoil tip, or ahead of a movable control surface, which, at the inception of reversal of flow in any such area will be actuated to give an unmistakable indication. Ordinarily stall characteristics do not occur at all these locations simultaneously, but depending on conditions of the air and the flight attitude of the aircraft, approach to a general stall will be indicated by the occurrence of partial or local stalling in one or more of such locations.

The arrangement shown in the drawing is largely diagrammatical, and is prepared for the purpose of illustrating the principles of the invention rather than for the purpose of indicating a practical and operative device.

Figure 1 is a perspective view of an airplane, showing the invention incorporated therein.

Figure 2 is a section through an airfoil equipped with the invention, showing parts in the position they would occupy during normal flight, and Figure 3 is a similar view, showing the position parts would assume under stall conditions.

In normal flight airflow over the upper skin of a sustaining airfoil (as illustrated in Figure 2) follows approximately the contour of the wing section, and joins the airflow over the under skin of the airfoil, at the trailing edge, with a minimum of disturbance. The airflow over the upper skin of the airfoil is therefore always and at all points substantially in a single rearward direction. A stall is produced by, or is accompanied by, a lessening of flow, or a reversal of flow, over the upper skin in the region where the boundary layer is thickened, as illustrated in Figure 3. A definitely different flow condition exists during the stall, as distinguished from normal flow conditions. While this may be considered as a pressure effect in the trailing edge portion, it is more convenient to think of it as a flow effect, which primarily it is, since it is the alteration in flow characteristics which causes the variation in pressure. A stall usually commences adjacent the trailing edge, and the affected area may at first be so restricted in extent, and the departure from smooth flow conditions so slight, that the lift of the wing as a whole is not materially affected, nor is the stall noticeable to the pilot by a change in the performance of the aircraft, but the stall area may spread more or less rapidly and abruptly, toward the leading edge and transversely, until the lift of the wing is negatived or destroyed. It is in the initial stages of a stall that it is desirable to indicate such a condition to the pilot, so that he may take corrective measures, and according to the invention this end is accomplished by flow-sensitive means located substantially in—that is, flush with—the upper surface to be sensitive to flow thereover, and to be held by that flow in one position during normal flight, but upon lessening of flow, or reversal of flow, or a tendency to reversal, such as accompanies or precedes a stall, this flow-sensitive device is caused or permitted to shift or move outward, and its movement is thereby capable of initiating any sort of signal that may be desired. This, then, constitutes the principle of the invention.

The invention is illustrated in connection with a sustaining wing 1, carrying the fuselage 2, which wing is shown as provided with a slot 10 adjacent its leading edge. This slot, however, is preferably normally closed by slot closures 11 and 12, respectively. As has been indicated, the slot 10 and the slot closures 11 and 12 may or may not be employed, as may be preferred, the invention residing in the provision of an indicator, and the provision of automatically operable stall delaying or correcting means, such as the slot and slot closures, being the subject of the parent application of Edmund T. Allen and Robert J. Minshall, Serial No. 364,090, mentioned above.

In the upper skin of the wing, in one or more locations such as will be discussed hereafter, flow-sensitive means are provided, typified by the light tab 3 pivoted at 30 ahead of its rear end, and in normal flight lying substantially flush with the upper surface of the wing. This position of the tab is ordinarily maintained by the normal airflow over it, but the tab must, statically by such a device as a spring or by its weight, or dynamically by reversed airflow under "burbling" conditions, be predisposed to shift to a different position upon interruption of smooth, normal airflow and initiation of stalling airflow. This tab may be made very small and light, and have a forward projection 31 inside the wing serving as a counterbalance, the weight and balance of the tab as a whole being such that the exterior tab portion tends to rise, yet by even slight, smooth flow past it in a rearward direction, as indicated in Figure 2, it will be held down substantially flush with the skin, and in this position of normal flight its contact finger 31 is held away from a complemental contact 42 within the wing. Other means to assist in holding the tab 3 in its normal position, or in inducing its movement toward the abnormal position shown in Figure 3, may be employed, if desired or required, the objective being to provide a means which requires but a small force, such as arises from "burbling," or a reversal of airflow, to move it from the normal position of Figure 2 to the stall indicating position of Figure 3.

Several such tabs may be employed, and preferably are employed in conjunction with each airfoil. This will depend in large degree, and their location upon the wing will likewise depend, upon the design of the particular airfoil and of the airplane as a whole. They should be located in such position as in the particular design experience, wind tunnel tests, or other calculations show will be the points at some one or more of which stall is initiated under various flight conditions. Stall may occur, for instance, with flaps up and power on at one location, but at a different location with flaps down and power off. Similarly tabs may be located at the points where stall is initiated with flaps down and power on, or with flaps up and power off, and such a tab should be located at any spot where, under any given flight condition, stall may first occur.

Preferably each such tab is connected in parallel in a single electrical circuit or equivalent means, so that when any one of them is actuated, by stalling turbulent or reversal of flow, a signal or indicator 4, which is typified by the red light on the dash in front of the pilot, will be energized. For example, each such tab 3 is grounded as indicated at 40, and adjacent and in the path of movement of each contact finger 31 there is positioned a complemental contact 42, previously referred to, which by its individual connection 43 is connected to a common lead 41, leading to the signal 4 and to the grounded power source diagrammatically indicated at 44. By this or any equivalent arrangement, when any one of the contact fingers 31 contacts its complemental contact 42, due to the rising of its tab 3, the signal at 4 is energized, and the pilot is informed immediately that a stall condition is imminent or has already been initiated. The signal, of course, may be any other type of signal, for instance, an audible signal, or several types of signal may be employed, all initiated by the raising of one or more of the tabs 3. Each tab may energize a different signal to indicate at which tab location stalling conditions first occur under a given set of circumstances, so that the most appropriate steps may be taken to correct the condition.

It is possible to have the same circuit energize a relay 5, thereby closing a switch 54 and energizing a line 55 leading to solenoids 51 and 52, respectively, which are connected to the respective slot closures 11 and 12. Means are provided to maintain these slot closures normally in slot-closed position, but upon energization of the solenoids 51 and 52, initiated by the rising of a tab 3, these slot closures are moved to slot-open position, as shown in Figure 3, and thereby the stall is automatically delayed or quelled. At the same time in the arrangement shown a signal is given to the pilot, to apprise him of the opening of the slot.

It should be noted that this stall indicator is not governed by the attitude of the airfoil, nor by pressure conditions, nor by airspeed, but wholly by flow conditions, and that it is actuated directly by "burbling" or the reversal of flow which is an essential manifestation of the initial stages of a stall. Further the tabs are so located, each in its own localized area where stall conditions may be initiated under given flight conditions, that each tab will give a proper signal at the initiation of the stall and before it has spread or progressed to a dangerous degree. Stalls occur not only in sustaining airfoils, but in other airfoils (as the tail surfaces) as well, and the same principles may be employed to indicate stalls in all such airfoils.

The invention claimed is:

1. Actuating mechanism for an indicator to indicate a stalling air flow condition over a selected portion of an aircraft airfoil, comprising flow sensitive means, pivot means supporting said flow sensitive means from the airfoil and guiding said flow sensitive means for swinging from a position within the marginal bounds of the airfoil and substantially coplanar with the surface thereof, wherein said flow sensitive means is held by smooth flow of air thereover, into a position projecting a substantial distance outward from the surface of the airfoil in response to stalling air flow over said flow sensitive means, and operating means for the indicator energizable by outward swinging of said flow sensitive means in response to stalling air flow thereover, to operate the indicator for indicating the presence of stalling air flow in the vicinity of said flow sensitive means.

2. In combination with an aircraft airfoil, a flow sensitive member, a pivot mounting supporting said flow sensitive member from the airfoil with the portion of said member rearward of said pivot mounting overlying a localized area of the airfoil surface, and guiding said member for swinging of such rearward portion thereof from a position within the marginal bounds of the airfoil and close to such airfoil surface, wherein said member is held by smooth air flow thereover, into an outwardly swung position spaced a substantial distance outward from such airfoil surface by turbulent air flow over said member, indicating means, and operating means for said indicating means energizable by swinging of the rear portion of said flow sensitive member outward from the airfoil surface by air flow reversal occurring during turbulent flow of air over said flow sensitive member to operate said indicating means, for indicating the presence of stalling air flow in the vicinity of said flow sensitive member.

3. In combination with an aircraft airfoil, an air flow responsive member, a pivot mounting supporting said air flow responsive member from the airfoil and guiding the portion of said member rearward of said pivot mounting for swinging from a position within the marginal bounds of the airfoil and close to the airfoil surface, wherein said member is held by smooth air flow thereover, into a position projecting a substantial distance outward from such airfoil surface in response to stalling air flow over said member, means urging said air flow responsive member to swing about its pivot mounting into such outwardly projecting position, to implement such swinging upon the occurrence of stalling air flow over said member, indicating means, and operating means for said indicating means energizable by such outward swinging of said air flow responsive member to operate said indicating means, for indicating the presence of stalling air flow in the vicinity of said air flow responsive member.

4. In combination with an aircraft airfoil, a thin light tab plate, a pivot mounting supporting said tab plate from the airfoil with the portion of said plate rearward of said pivot mounting overlying the upper airfoil surface, and guiding said tab plate for swinging of such rearward portion thereof from a position within the marginal bounds of the airfoil and close to such airfoil surface, wherein said plate is held by smooth air flow thereover, into an upwardly swung position spaced a substantial distance above such airfoil surface in response to stalling air flow over said tab plate, indicating means, and operating means for said indicating means energizable by swinging of the rear portion of said tab plate upward away from the upper airfoil surface to operate said indicating means, for indicating the presence of stalling air flow in the vicinity of said tab plate.

FLORENCE BRYDON ALLEN,
THE PACIFIC NATIONAL
                BANK OF SEATTLE,
By W. F. MUEHE,
    *Cashier,*
ROBERT E. LEWIS,
    *Vice President and Trust Officer,*
*Executors of the Estate of Edmund T. Allen, Deceased.*